US005493160A

United States Patent [19]

Botten

[11] Patent Number: 5,493,160

[45] Date of Patent: Feb. 20, 1996

[54] AIR FILTER FOR ELECTRIC MOTORS

[76] Inventor: Thomas J. Botten, 14420 Oak Ct., Lockport, Ill. 60441

[21] Appl. No.: 213,646

[22] Filed: Mar. 16, 1994

[51] Int. Cl.[6] .......... H02K 9/26

[52] U.S. Cl. .......... 310/88; 310/56

[58] Field of Search .......... 310/56, 88, 89; 15/344, 347, 412, 413; 55/373, 378, 385.1, 506, 528, DIG. 26

[56] References Cited

U.S. PATENT DOCUMENTS

| | | | |
|---|---|---|---|
| 1,260,282 | 3/1918 | Harrold | 15/413 |
| 2,594,003 | 4/1952 | Else et al. | 310/88 |
| 3,538,686 | 11/1970 | Schwab | 55/378 |
| 3,890,125 | 6/1975 | Schoeck | 55/528 |
| 4,072,483 | 2/1978 | Doyle, Jr. | 15/347 |
| 4,262,384 | 4/1981 | Bowers | 55/378 |
| 4,399,378 | 8/1983 | Krumm et al. | 310/56 |
| 4,591,369 | 5/1986 | Stewart, Sr. et al. | 55/378 |

*Primary Examiner*—Clayton E. LaBalle
*Attorney, Agent, or Firm*—Schiff Hardin & Waite

[57] ABSTRACT

The invention relates to a filter assembly for capturing particles in electric motor exhaust streams. That assembly comprises a filter of extended surface area, including filter material and a frame substantially wrapped by the filter material, and a securing means, preferably a C-shaped channel, for receiving the filter frame. In operation, the filter is slid into the channel and is held securely by the channel so that a positive seal is formed between the channel and the filter as an exhaust stream is passed through the filter.

8 Claims, 1 Drawing Sheet

10
40
40
25
50
25
10
40
10
40
40
25
20
40
40
10

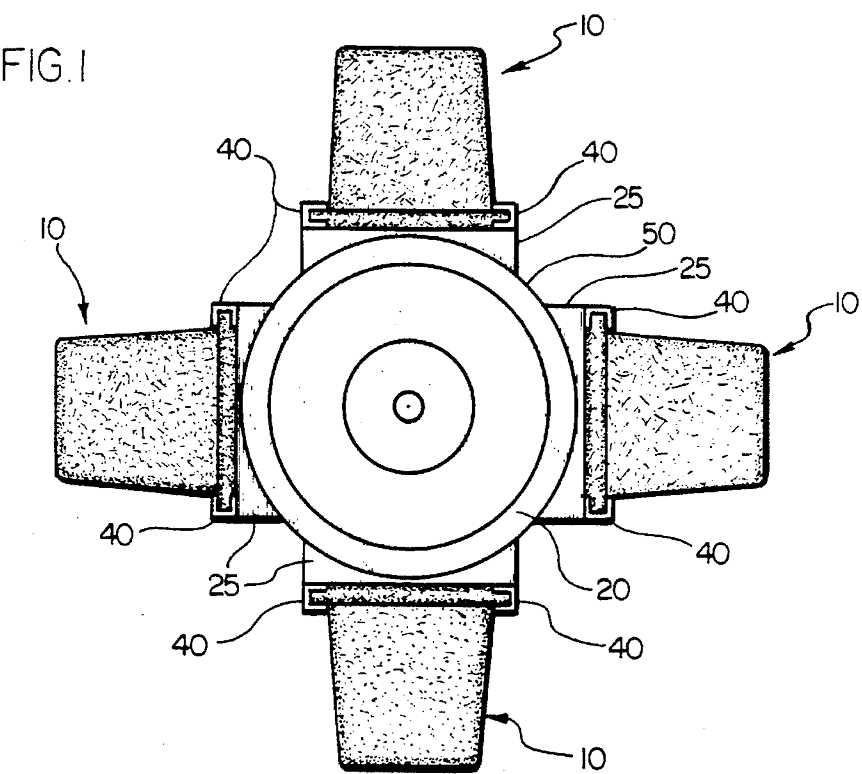
FIG.1
10
40
40
25
50
25
40
10
10
40
40
25
20
40
40
10
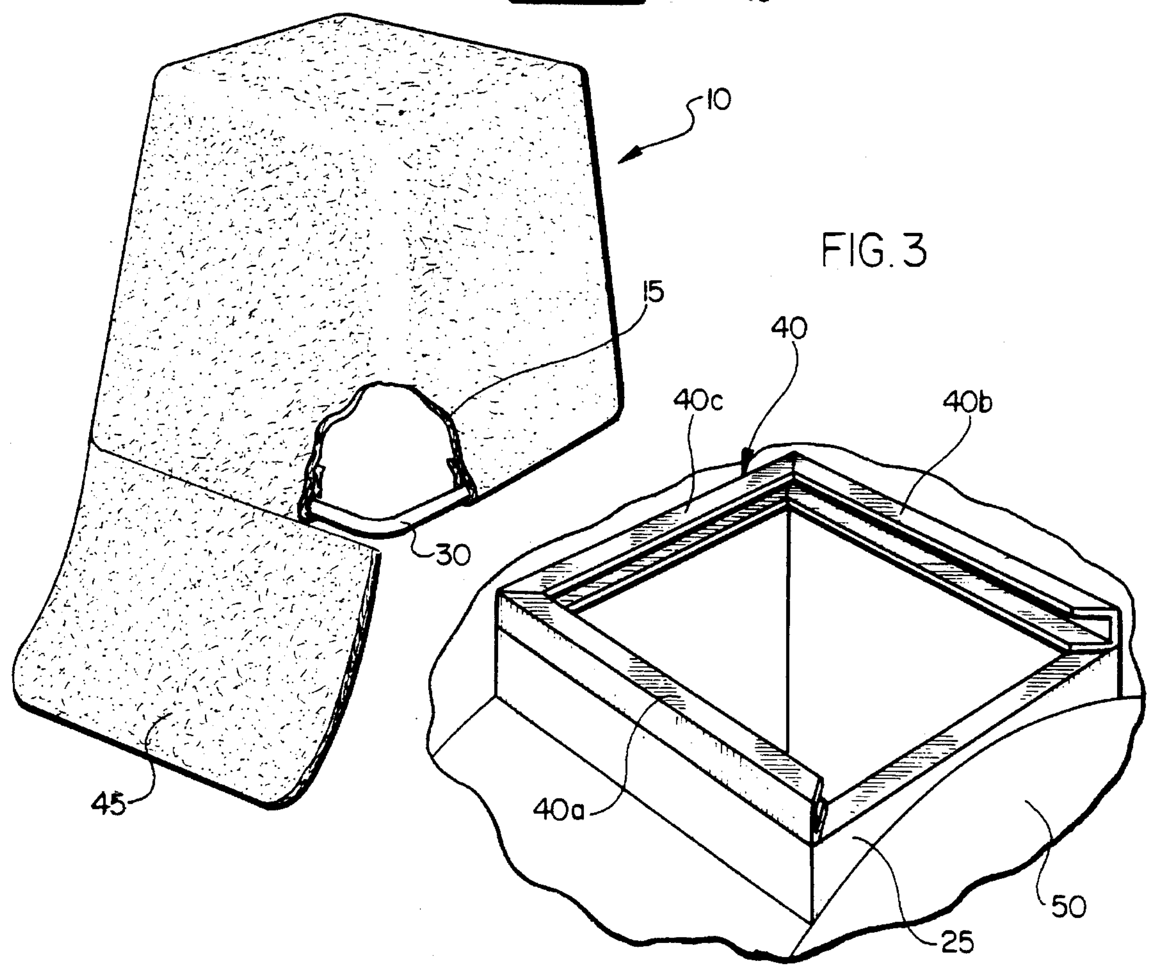
FIG.2
10
15
30
45
FIG.3
40
40c
40b
40a
25
50

AIR FILTER FOR ELECTRIC MOTORS

AIR FILTER FOR ELECTRIC MOTORS

The present invention relates to an apparatus useful for filtering particulate matter in electric motor exhaust streams, and particularly useful for filtering minute particles of carbon dust resulting from the degradation of graphite brushes employed in electric motors.

BACKGROUND OF THE INVENTION

Electric motors have been used for years with little concern being paid to the exhaust streams they produce. Typically, air-stream filtration concerns have been directed to the air intake vents of such motors, to prevent particulate from being introduced into the motors, where they could interfere with proper motor operation and possibly destroy the motor or its components. A variety of solutions to the air intake problems have been proposed, some of which are reflected in U.S. Pat. Nos. 1,009,951, 1,434,640, 1,750,446, 1,963,398, 1,963,401 and 2,205,128.

In contrast to air-intake concerns, the exhausts of electric motors have been given little attention. This has reflected both a lack of knowledge or awareness of the particulate emissions from electric motors, and a general belief that any such emissions were harmless.

In recent years, however, such concerns have been amplified because the brushes used in such motors degrade relatively quickly and in a manner that is likely to pollute the surrounding atmosphere (affecting indoor air quality) and foul equipment rooms. Graphite particles find their way into the air intakes of nearby equipment, leading to more frequent service calls, increased maintenance costs, and in the absence of careful maintenance (or even an awareness of the problem), costly equipment failure. Such failures may also be dangerous if they occur in elevator systems, which often use electric motors having graphite brushes. The placement of solid state equipment nearby to those motors increases concerns about pollutants, since such equipment is particularly vulnerable to breakdown or malfunction as a result of the intrusion of carbon dust.

Users of electric motors that employ graphite brushes have sought to overcome these problems by filtering motor exhaust vents. Thus, some users have wrapped motor exhausts in cloth bags to capture carbon particles generated by the degradation of brushes. Such bags, however, do a poor job of preventing carbon dust from entering the air stream, because of wide variability in the pore size of such cloth bags and poor fits to the motors. At the same time, such bags may also prevent inadequate air flow through the motor, causing an undesirable increase in motor temperature. Thus, motor users are in need of a new and different method of filtering electric motor exhaust streams.

SUMMARY OF THE INVENTION

The present invention relates to a filter assembly for capturing particles in electric motor exhaust streams. The assembly comprises a filter, including filter material and a frame substantially wrapped by the filter material. The filter used in the invention has an extended surface area to capture exhaust particles. The assembly also includes a securing means for securing the filter to the motor housing; that securing means is preferably a C-shaped channel for receiving the filter frame. The channel is joined to the motor's housing at an exhaust vent in the housing. In operation, the filter is slid into the channel and is held securely by the channel so that a positive seal is formed between the channel and the filter as an exhaust stream is passed through the filter.

It is an object of the present invention to provide a sealed filter for the electric motor exhaust streams without adversely affecting air flow through the motor and without causing an undesirable increase in motor temperature.

It is another object of the invention to provide such a filter in disposable form on a cost-effective basis.

The manner in which the present invention accomplishes these objectives will be made clear by a discussion of specific embodiments of the invention below.

BRIEF DESCRIPTION OF THE DRAWINGS

FIG. 1 is an end view of a motor employing an embodiment of the filters of the present invention.

FIG. 2 is a cutaway perspective view of a filter made according to the invention.

FIG. 3 is a perspective view of the channel used to retain the filter according to the present invention.

DETAILED DESCRIPTION OF THE INVENTION

As shown in FIGS. 1 and 2, the filter of the present invention is made from a sheet material 15 consisting of an amorphous network of polyester fibers. Such material is of the type generally described in Sanders, U.S. Pat. No. 5,215,609, which is hereby incorporated by reference. Preferably, the filter is assembled according to the ultrasonic welding method described therein. The material preferably is a blend of 6 and 15 denier polyester fibers, with 15 denier fibers predominant in the blend. It must be understood, however, that the particular blend of fibers may vary according to the application in which a filter made and used according to the invention is employed.

Each filter 10 must be sized for the specific motor 20 and vent 25 upon which it will be used. First, the size of each vent 25 is measured to determine a footprint for the filter. For instance, if a motor exhaust vent is a square six inches on a side, the footprint of the filter also will be six inches on a side. A filter frame 30, made preferably of metal (but possibly of any other rigid material capable of withstanding the service temperature of the particular application in which it will be employed), is assembled in the shape and size of the motor vent. This frame forms the footprint of the filter.

The polyester sheet material 15 used in the filter is sized, cut and welded as set forth in U.S. Pat. No. 5,215,609 so that the frame is contained within a pocket 35 formed by the filter material as it is folded back upon itself. The filter 10 is shaped to form an extended surface, viz., a cube— or bag-shape of sufficient depth, greater than the thickness of the material itself, to permit air to flow easily through the filter and to avoid increasing the operating temperature of the motor. The surface area of the filter so formed should also be large enough to avoid having to replace the filter so frequently that its use becomes cost-prohibitive. Thus, in general, the filter should be as deep as the motor and its service application permit, in order to increase the service life of the filter. Filter depth will usually be limited, however, by space constraints in the cabinet or room in which the motor is installed.

In a particularly preferred arrangement, a filter is attached to each motor exhaust vent by sliding it into a C-shaped (in cross-section) channel 40 that is part of, or bonded to, the motor's housing 50 along the periphery of the vent 25. Because existing motors do not contain such channels, the channels 40 may be attached to the periphery of the motor vent by any appropriate means, such as by welding or by adhesive. Two-sided, heavy-duty adhesive tape, such as that sold by 3M under the trademark VHB, is particularly useful because it permits quick and secure adhesion to the motor housing with a minimum of labor and expense. The channels may be made from metal or other material suitable for the particular thermal and stress requirements resulting from the operation of the motor. Likewise, securing means other than the channel, such as adhesive or hook-and-loop tape (such as that sold under the mark VELCRO) may be used to join the filter to the housing.

As shown in FIG. 3, channel is provided on at least two opposite sides 40*a*, 40*b* of each motor vent 25, so that the end of the filter in which the frame is placed can be securely slid into position to completely cover the exhaust vent. The channel thus secures the filter along two of the frame edges. Preferably, a third channel component 40*c* extends between the first two channel components, to secure the filter along three edges. The channel, in combination with the filter, forms a positive seal along each secured edge as air pressure biases the filter away from the motor housing and against the upper lip of the channel.

In a preferred embodiment, shown in FIG. 2, each filter includes at least one extension or flap 45 of extra filter material. This flap 45 is used to provide an additional seal along each edge of the filter not secured by a channel. The flap 45 is folded under the filter frame 30, to fill any gap that might form between the filter and the motor housing 50 when pressure from the motor exhaust pushes the filter outward. Alternatively, each flap can be secured to the motor housing by use of an adhesive or by hook tape, such as that sold under the mark VELCRO.

The filtration system provided by the present invention thus permits capture of carbon particles formed as graphite motor brushes degrade in service, thereby reducing pollution and lessening the risk of equipment damage or failure because of intrusion by carbon particles. Because the filters may be custom-designed for each motor application, the filtration system can readily be added to motors now in service, as well as being employed in new motors. Finally, because the filters are disposable, they provide an inexpensive solution to a costly problem.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A filter assembly for capturing particles in electric motor exhaust streams comprising:

a filter (i) a filter material made from a substantially amorphous network of fibers and (ii) a frame substantially wrapped by the filter material, the filter material having an extended surface area and defining a surface that is closed except for an open area defined by the frame;

channel means for securing the filter to a motor housing at an exhaust vent in the housing;

whereby the filter is slid into the channel means with the open area adjacent to the exhaust vent and is held securely by the channel means so that a positive seal is formed between the channel means and the filter as an exhaust stream is passes through the filter.

2. The filter assembly of claim 1, wherein the means for securing is a C-shaped channel for receiving the filter frame, the channel being joined to the motor's housing at an exhaust vent in the motor housing.

3. The filter assembly of claim 1, wherein the filter material is an amorphous network of polyester fibers.

4. The filter assembly of claim 3, wherein the frame is a metal frame.

5. The filter assembly of claim 2, wherein the channel is an integral part of the motor housing.

6. The filter assembly of claim 2, wherein the channel is bonded to the motor housing by an adhesive.

7. The filter assembly of claim 2, wherein the exhaust vent has a plurality of sides, and the channel is joined to the housing along at least two sides of the exhaust vent.

8. The filter assembly of claim 2, wherein the filter has at least one flap of filter material extending outwardly from the frame and substantially in the same plane as the frame, the flap being positioned so that when the filter is slid into the channel, the flap may be folded under an edge of the filter that is not sealed to the channel.

* * * * *

UNITED STATES PATENT AND TRADEMARK OFFICE

CERTIFICATE OF CORRECTION

PATENT NO. : 5,493,160

DATED : February 20, 1996

INVENTOR(S) : Thomas J. Botten

It is certified that error appears in the above-indentified patent and that said Letters Patent is hereby corrected as shown below:

Claim 1, at col. 4, line 11, insert —including— after "filter" and before "(i)."

Claim 1, at col. 4, line 25, change "passes" to —passed—.

Signed and Sealed this

Twenty-fifth Day of June, 1996

Attest:

BRUCE LEHMAN

*Attesting Officer*

*Commissioner of Patents and Trademarks*